United States Patent
Lee et al.

(10) Patent No.: US 10,599,536 B1
(45) Date of Patent: Mar. 24, 2020

(54) PREVENTING STORAGE ERRORS USING PROBLEM SIGNATURES

(71) Applicant: Pure Storage, Inc., Mountain View, CA (US)

(72) Inventors: Patrick Lee, Los Altos, CA (US); Vinay Perneti, Mountain View, CA (US); Sergey Zhuravlev, Gilroy, CA (US)

(73) Assignee: Pure Storage, Inc., Mountain View, CA (US)

( * ) Notice: Subject to any disclaimer, the term of this patent is extended or adjusted under 35 U.S.C. 154(b) by 36 days.

(21) Appl. No.: 15/179,301

(22) Filed: Jun. 10, 2016

Related U.S. Application Data

(63) Continuation of application No. 14/920,994, filed on Oct. 23, 2015, now Pat. No. 9,384,082.

(51) Int. Cl.
  *G06F 11/07* (2006.01)
  *G06F 11/20* (2006.01)
  *G06F 3/06* (2006.01)

(52) U.S. Cl.
  CPC ........ *G06F 11/2069* (2013.01); *G06F 3/0614* (2013.01); *G06F 3/0653* (2013.01); *G06F 3/0683* (2013.01); *G06F 11/079* (2013.01); *G06F 11/0727* (2013.01); *G06F 11/0793* (2013.01); *G06F 2201/805* (2013.01)

(58) Field of Classification Search
  None
  See application file for complete search history.

(56) References Cited

U.S. PATENT DOCUMENTS

| 5,706,210 A | 1/1998 | Kumano et al. |
| 5,799,200 A | 8/1998 | Brant et al. |

(Continued)

FOREIGN PATENT DOCUMENTS

| EP | 0725324 A2 | 8/1996 |
| EP | 3365783 A1 | 8/2018 |

(Continued)

OTHER PUBLICATIONS

The International Search Report and the Written Opinion received for International Application No. PCT/US2016/016333 from the International Searching Authority (ISA), dated Jun. 8, 2016, 11 pages.

(Continued)

*Primary Examiner* — Yolanda L Wilson

(57) ABSTRACT

Proactively providing corrective measures for storage arrays includes: receiving data from a storage array, the data including one or more events; detecting, in dependence upon a problem signature, one or more events from the data indicative of a particular problem, where the problem signature comprises a specification of a pattern of events indicative of the particular problem experienced by at least one other storage array; determining whether the particular problem violates an operational policy of the storage array, the operational policy specifying at least one requirement for an operational metric of the storage array; and if the particular problem violates the operational policy of the storage array, deploying automatically without user intervention one or more corrective measures to prevent the storage array from experiencing the particular problem.

20 Claims, 4 Drawing Sheets

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,271,700 B1 | 9/2012 | Annem et al. |
| 8,387,136 B2 | 2/2013 | Lee et al. |
| 8,437,189 B1 | 5/2013 | Montierth et al. |
| 8,452,741 B1* | 5/2013 | Kuhr .............. G06F 16/125 707/694 |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,134,922 B2 | 9/2015 | Rajagopal et al. |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,444,822 B1 | 9/2016 | Borowiec et al. |
| 9,507,532 B1 | 11/2016 | Colgrove et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1* | 8/2004 | Ghose .............. H04L 41/064 714/42 |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1* | 9/2005 | Bicknell .............. G06F 11/008 714/718 |
| 2006/0015771 A1 | 1/2006 | Vana Gundy et al. |
| 2006/0088049 A1 | 4/2006 | Kastein et al. |
| 2006/0129817 A1 | 6/2006 | Borneman et al. |
| 2006/0161726 A1 | 7/2006 | Lasser |
| 2006/0200726 A1* | 9/2006 | Gittins .............. G06F 11/0727 714/763 |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0262890 A1* | 10/2008 | Korupolu ............ G06F 11/0793 705/7.22 |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2009/0287961 A1* | 11/2009 | Austin ............... G06F 11/26 714/37 |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303581 A1 | 11/2012 | Calder et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0326284 A1 | 12/2013 | Losh et al. |
| 2013/0332614 A1 | 12/2013 | Brunk et al. |
| 2014/0006357 A1 | 1/2014 | Davis et al. |
| 2014/0019813 A1 | 1/2014 | McLean et al. |
| 2014/0020083 A1 | 1/2014 | Fetik |
| 2014/0074850 A1* | 3/2014 | Noel .............. G06F 9/542 707/741 |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |

(56) References Cited

U.S. PATENT DOCUMENTS

| | | | |
|---|---|---|---|
| 2015/0095515 | A1 | 4/2015 | Krithivas et al. |
| 2015/0113203 | A1 | 4/2015 | Dancho et al. |
| 2015/0121137 | A1 | 4/2015 | McKnight et al. |
| 2015/0134920 | A1 | 5/2015 | Anderson et al. |
| 2015/0149822 | A1 | 5/2015 | Coronado et al. |
| 2015/0193169 | A1 | 7/2015 | Sundaram et al. |
| 2015/0378888 | A1 | 12/2015 | Zhang et al. |
| 2016/0085606 | A1* | 3/2016 | Panasko .............. G06F 11/079 714/37 |
| 2016/0098323 | A1 | 4/2016 | Mutha et al. |
| 2016/0350009 | A1 | 12/2016 | Cerreta et al. |
| 2016/0352720 | A1 | 12/2016 | Hu et al. |
| 2016/0352830 | A1 | 12/2016 | Borowiec et al. |
| 2016/0352834 | A1 | 12/2016 | Borowiec et al. |

FOREIGN PATENT DOCUMENTS

| | | | |
|---|---|---|---|
| WO | WO 2012/087648 | A1 | 6/2012 |
| WO | WO2013071087 | A1 | 5/2013 |
| WO | WO 2014/110137 | A1 | 7/2014 |
| WO | WO 2016/015008 | A1 | 12/2016 |
| WO | WO 2016/190938 | A1 | 12/2016 |
| WO | WO 2016/195759 | A1 | 12/2016 |
| WO | WO 2016/195958 | A1 | 12/2016 |
| WO | WO 2016/195961 | A1 | 12/2016 |

OTHER PUBLICATIONS

ETSI, *Network Functions Virtualisation (NFV)*; Resiliency Requirements, ETSI GS NFV-REL 001, V1.1.1 (Jan. 2015), Downloaded from: http://www,etsi.org, Link to Document: http://www.etsi.org/deliver/etsi_gs/NFV-REL/001_099/001/01.01.01_60/gs_NFV-REL001v010101p.pdf, European Telecommunications Standards Institute, 2015, 82 pages.

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

PCMag. "Storage Array Definition". Published May 10, 2013. <http://web.archive.org/web/20130510121646/http://www.pcmag.com/encyclopedia/term/52091/storage-array>, 2 pages.

Google Search of "storage array define" performed by the Examiner on November 4, 2015 for U.S. Appl. No. 14/725,278, Results limited to entries dated before 2012, 1 page.

Techopedia. "What is a disk array". Published Jan. 13, 2012. <http://web.archive.org/web/20120113053358/http://www.techopedia.com/definition/1009/disk-array>, 1 page.

Webopedia. "What is a disk array". Published May 26, 2011. <http://web/archive.org/web/20110526081214/http://www.webopedia.com/TERM/D/disk_array.html>, 2 pages.

Li et al., *Access Control for the Services Oriented Architecture*, Proceedings of the 2007 ACM Workshop on Secure Web Services (SWS '07), Nov. 2007, pp. 9-17, ACM New York, NY.

The International Search Report and the Written Opinion received from the International Searching Authority (ISA/EPO) for International Application No. PCT/US2016/015006, dated Apr. 29, 2016, 12 pages.

The International Search Report and the Written Opinion received from the International Searching Authority (ISA/EPO) for International Application No. PCT/US2016/015008, dated May 4, 2016, 12 pages.

C. Hota et al., *Capability-based Cryptographic Data Access Control in Cloud Computing*, Int. J. Advanced Networking and Applications, col. 1, Issue 1, dated Aug. 2011, 10 pages.

The International Search Report and the Written Opinion received from the International Searching Authority (ISA/EPO) for International Application No. PCT/US2016/020410, dated Jul. 8, 2016, 17 pages.

The International Search Report and the Written Opinion received from the International Searching Authority (ISA/EPO) for International Application No. PCT/US2016/032084, dated Jul. 18, 2016, 12 pages.

Faith, "dictzip file format", GitHub.com (online). [Accessed Jul. 28, 2015], 1 page, URL: https://github.com/fidlej/idzip.

Wikipedia, "Convergent Encryption", Wikipedia.org (online), accessed Sep. 8, 2015, 2 pages, URL: en.wikipedia.org/wiki/Convergent_encryption.

Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.

The International Search Report and the Written Opinion received from the International Searching Authority (ISA/EPO) for International Application No. PCT/US2016/032052, dated Aug. 30, 2016, 17 pages.

Microsoft, "Hybrid for SharePoint Server 2013—Security Reference Architecture", <http://hybrid.office.com/img/Security_Reference_Architecture.pdf> (online), dated Oct. 2014, 53 pages.

Microsoft, "Hybrid Identity", <http://aka.ms/HybridIdentityWp> (online), dated Apr. 2014, 36 pages.

Microsoft, "Hybrid Identity Management", <http://download.microsoft.com/download/E/A/E/EAE57CD1-A80B-423C-96BB-142FAAC630B9/Hybrid_Identity_Datasheet.pdf> (online), published Apr. 2014, 17 pages.

Jacob Bellamy-McIntyre et al., "OpenID and the Enterprise: A Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.

The International Search Report and the Written Opinion received from the International Searching Authority (ISA/EPO) for International Application No. PCT/US2016/035492, dated Aug. 17, 2016, 10 pages.

The International Search Report and the Written Opinion received from the International Searching Authority (ISA/EPO) for International Application No. PCT/US2016/036693, dated Aug. 29, 2015, 10 pages.

The International Search Report and the Written Opinion received from the International Searching Authority (ISA/EP) for International Application No. PCT/US2016/038758, dated Oct. 7, 2016, 10 pages.

The International Search Report and the Written Opinion received from the International Searching Authority (ISA/EP) for International Application No. PCT/US2016/040393, dated Sep. 22, 2016, 10 pages.

The International Search Report and the Written Opinion received from the International Searching Authority (ISA/EP) for International Application No. PCT/US2016/044020, dated Sep. 30, 2016, 11 pages.

Kwok Kong, *Using PCI Express as the Primary System Interconnect in Multiroot Compute, Storage, Communications and Embedded Systems*, IDT, White Paper, <http://www.idt.com/document/whp/idt-pcie-multi-root-white-paper>, retrieved by WIPO Dec. 4, 2014, dated Aug. 28, 2008, 12 pages.

The International Search Report and the Written Opinion received from the International Searching Authority (ISA/EP) for International Application No. PCT/US2016/044874, dated Oct. 7, 2016, 11 pages.

The International Search Report and the Written Opinion received from the International Searching Authority (ISA/EP) for International Application No. PCT/US2016/044875, dated Oct. 5, 2016, 13 pages.

The International Search Report and the Written Opinion received from the International Searching Authority (ISA/EP) for International Application No. PCT/US2016/044876, dated Oct. 21, 2016, 12 pages.

(56) References Cited

OTHER PUBLICATIONS

The International Search Report and the Written Opinion received from the International Searching Authority (ISA/EP) for International Application No. PCT/US2016/044877, dated Sep. 29, 2016, 13 pages.

Xiao-Yu Hu et al., *Container Marking: Combining Data Placement, Garbage Collection and Wear Levelling for Flash*, 19th Annual IEEE International Symposium on Modelling, Analysis, and Simulation of Computer and Telecommunications Systems, ISBN: 978-0-7695-4430-4, DOI: 10.1109/MASCOTS.2011.50, dated Jul. 25-27, 2011, 11 pages.

\* cited by examiner

PREVENTING STORAGE ERRORS USING PROBLEM SIGNATURES

CROSS-REFERENCE TO RELATED APPLICATION

This application is a continuation application of and claims priority from U.S. patent application Ser. No. 14/920,994, filed on Oct. 23, 2015.

BACKGROUND

Field of Technology

The field of technology is data processing, or, more specifically, methods, apparatus, and products for proactively providing corrective measures for storage arrays.

Description of Related Art

Data centers may include many computing components including servers, network devices, and storage arrays. As the need for storage of large amounts of data and efficient access to that data increases, storage array technology is advancing. Such storage arrays may provide persistent storage for any number of computing devices in a data center. As the number of storage arrays in a data center increases and the types of such storage arrays begins to vary, different storage arrays may be susceptible to different types of problems. Preventing such disparate types of problems across a large set of storage arrays may be difficult. Further, each corrective measure deployed to prevent such a problem may adversely affect the performance of the storage array's performance during the deployment of the corrective measure.

SUMMARY

Methods, apparatus, and products for proactively providing corrective measures for storage arrays are disclosed in this specification. Proactively providing such corrective measures for storage arrays includes: receiving data from a storage array, the data including one or more events; detecting, in dependence upon a problem signature, one or more events from the data indicative of a particular problem, where the problem signature comprises a specification of a pattern of events indicative of the particular problem experienced by at least one other storage array; determining whether the particular problem violates an operational policy of the storage array, the operational policy specifying at least one requirement for an operational metric of the storage array; and if the particular problem violates the operational policy of the storage array, deploying automatically without user intervention one or more corrective measures to prevent the storage array from experiencing the particular problem.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatus, and products for proactively providing corrective measures for storage arrays in accordance with the present invention are described with reference to the accompanying drawings, beginning with FIG. 1.

Figure 1:
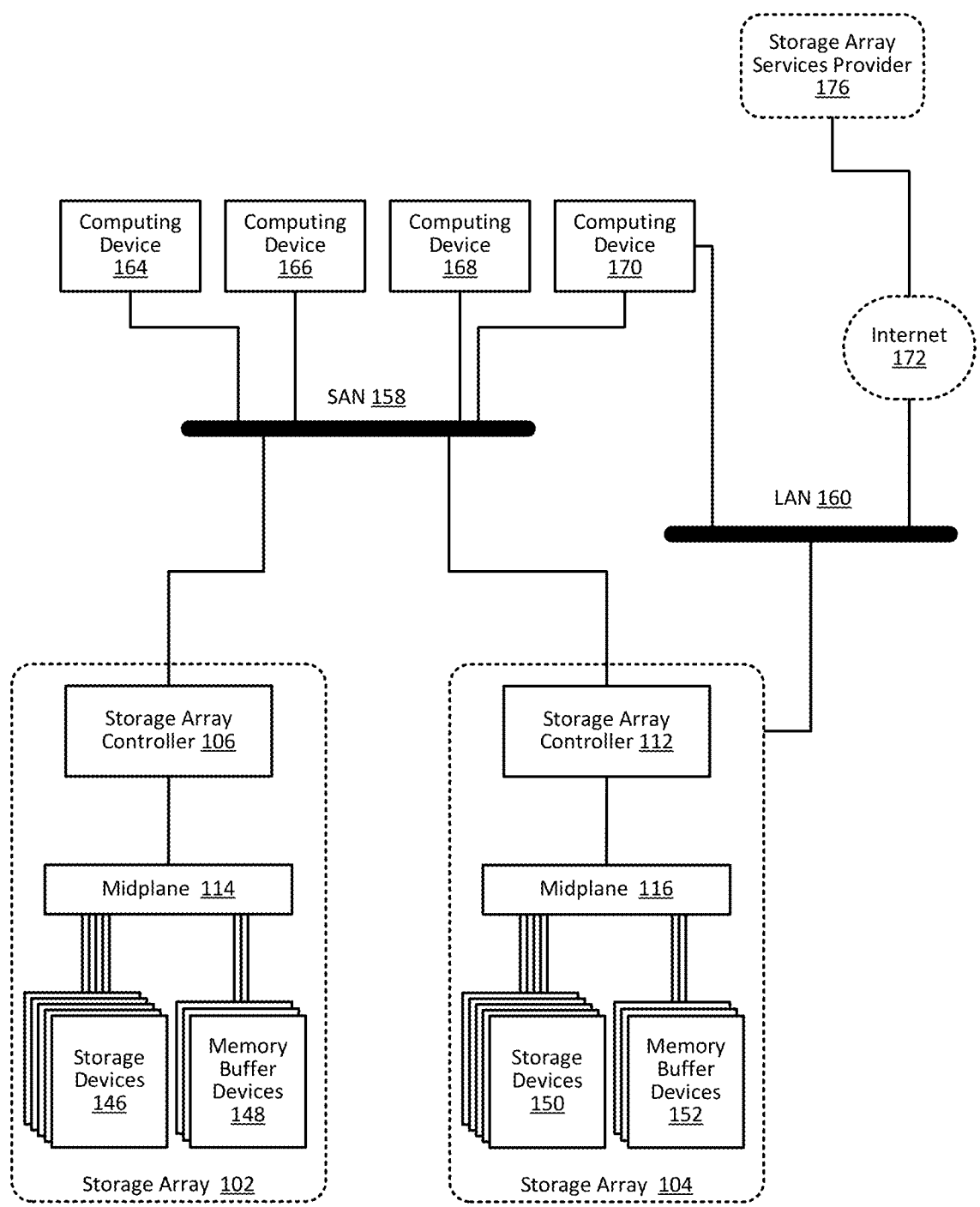
FIG. 1 sets forth a block diagram of a system configured for providing corrective measures for storage arrays according to embodiments of the present invention.

FIG. 1 sets forth a block diagram of a system configured for providing corrective measures for storage arrays according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164-170) in the example of FIG. 1 are coupled for data communications to a number of storage arrays (102, 104) through a storage area network (SAN) (158) as well as a local area network (160) (LAN). The SAN (158) may be implemented with a variety of data communications fabrics, devices, and protocols. Example fabrics for such a SAN may include Fibre Channel, Ethernet, Infiniband, SAS (Serial Attached Small Computer System Interface), and the like. Example data communications protocols for use in such a SAN (158) may include ATA (Advanced Technology Attachment), Fibre Channel Protocol, SCSI, iSCSI, HyperSCSI, and others. Readers of skill in the art will recognize that a SAN is just one among many possible data communications couplings which may be implemented between a computing device and a storage array. Any other such data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include TCP (Transmission Control Protocol), UDP (User Datagram Protocol), IP (Internet Protocol), HTTP (HyperText Transfer Protocol), WAP (Wireless Access Protocol), HDTP (Handheld Device Transport Protocol), SIP (Session Initiation Protocol), RTP (Real Time Protocol) and others as will occur to those of skill in the art.

The example storage arrays (102, 104) of FIG. 1 provide persistent data storage for the computing devices. Each storage array (102, 104) includes a storage controller (106, 112). The storage controller is a module of automated computing machinery comprising computer hardware, computer software, or a combination of computer hardware and software. The storage controller may be configured to carry out various storage-related tasks. Such tasks may include writing data received from a computing device to storage, erasing data from storage, retrieving data from storage to provide to a computing device, monitoring and reporting of disk utilization and performance, performing RAID (Redundant Array of Independent Drives) or RAID-like data redundancy operations, compressing data, encrypting data, and so on.

Each storage controller (106, 112) may be implemented in a variety of ways, including as an FPGA (Field Programmable Gate Array), a PLC (Programmable Logic Chip), an ASIC (Application Specific Integrated Circuit), or computing device that includes discrete components such as a central processing unit, computer memory, and various adapters. Each storage controller (106, 112) may, for example, include a data communications adapter configured to support communications via the SAN (158) and the LAN (160). Only one of the storage controllers (112) in the example of FIG. 1 is depicted as coupled to the LAN (160) for data communications for clarity. Readers should understand that both storage controllers (106, 112) are independently coupled to the LAN (160). Each storage controller (106, 112) may also, for example, include an I/O controller or the like that couples the storage controller (106, 112) for data communications, through a midplane (114), to a number of storage devices (146, 150), and a number of write buffer devices (148, 152) devices.

Each write buffer device (148, 152) may be configured to receive, from the storage controller (106, 112), data to be stored in the storage devices (146). Such data may originate from any one of the computing devices (164-170). In the example of FIG. 1, writing data to the write buffer device may be carried out more quickly than writing data to the storage device. The storage controller (106, 112) may be configured to effectively utilize the write buffer devices (148, 152) as a quickly accessible redundant buffer for data destined to be written to storage. In this way, if the storage device to which the data is to be written fails or if the write does not complete, the write buffer device may maintain the data to be written during a retry of the write or during failover of the storage device to another location. That is, the write buffer device may provide redundancy for the storage devices.

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives ("Flash drives"), and the like.

In addition to being coupled to the computing devices through the SAN (158), the storage arrays may also be coupled to the computing devices through the LAN (160) and to one or more cloud service providers through the Internet (172). The term 'cloud' as used in this specification refers to systems and computing environments that provide services to user devices through the sharing of computing resources through a network. Generally, the user device is unaware of the exact computing resources utilized by the cloud system to provide the services. Although in many cases such 'cloud' environments or systems are accessible via the Internet, readers of skill in the art will recognize that any system that abstracts the use of shared resources to provide services to a user through any network may be considered a cloud-based system.

One example cloud service in FIG. 1 is a storage array services provider (176). The storage array service provider (176) may be configured to provide various storage array services such as reporting of storage array performance characteristics, configuration control of the storage arrays, and the like. The storage array services provider may rely on modules executing on the storage array itself to gather or process such data.

The system of FIG. 1 may be configured, according to embodiments of the present invention, to proactively provide corrective measures for storage arrays. The storage array services provider (176) in the example of FIG. 1 may receive data from a storage array, where the data includes one or more events. Data received from a storage array may take various forms including, for example, log data from components of the storage array. Such log data may include a description of events that occur at the components of the storage array. Such events may include exceptions, errors, performance metrics, and other types of occurrences.

The storage array services provider may also detect, in dependence upon a problem signature, one or more events from the data that are indicative of a particular problem. A 'problem signature' as the term is used in this specification refers to a specification of a pattern of events indicative of a particular problem experienced by at least one storage array in a multiple array storage environment. In this way, a problem signature may be used to project the occurrence of a problem in one or more storage arrays in the storage environment before that problem is exhibited. The generation of such a problem signature may be based on events from one or more storage arrays that experienced the particular problem. When multiple storage arrays, for example, suffer the same problem, the events leading up to the occurrence of the problem may be cross correlated amongst the arrays to identify a similar pattern of events. Such a pattern of events may be utilized to generate the problem signature for the particular problem. Then, when a storage array experiences the same pattern of events, even before experiencing the particular problem, the storage array services provider may, through the use of the problem signature, detect the events as indicative of the particular problem.

In another embodiment, a particular issue may occur on one or more arrays, set 'A,' but that same particular issue may not yet have occurred or have been observed on another one or more arrays, set 'B.' To generate a problem signature in such an environment, the one or more storage arrays of set 'A' may be inspected for common characteristics, such as software version, controller type, performance settings, and the like. The particular issue may arise on only set A, rather than set B, for various reasons and as an effect of such common characteristics. In some instances, for example, the particular issue may arise on set A due to set A running a newer software version then set B. In such an instance, when set B is upgraded to the newer software version, set B would match the problem signature for the particular issue and a candidate for the proactive upgrades.

In some embodiments, the cloud storage array services provider (176) may assign a severity level to each particular problem or each problem signature. The cloud storage array services provider may classify an application level of the corrective measures in dependence upon the severity of the problem and the potential impact of deploying corrective measures. For example, a problem signature may be classified as follows in descending order of likelihood for application:

a. a high severity problem with low impact corrective measures;
 b. a low severity problem with low impact corrective measures;
 c. a high severity problem with high impact corrective measures; and d. a low severity problem with high impact corrective measures.

In this way, highly severe problems that are common across many storage arrays, regardless of each of the storage arrays' operational policies, may be identified and corrective measures may be applied in accordance with the severity.

The storage array services provider (176) in the example of FIG. 1 may then determine whether the particular problem violates an operational policy of the storage array. A storage array may be subject to any number of operational policies. An operational policy as the term is used in this specification refers to a policy that specifies at least one requirement for an operational metric of the storage array. Operational metrics may be any type of metric that describes operation of the storage array including, for example, throughput, data reduction, high availability, and the like. One particular example of an operational policy may be a service level agreement for a required quality of service. Another example may be related to ensuring performance objectives of the storage array during recovery such as meeting the recovery point objective ('RPO') or recovery time objective ('RTO'). A user of the storage array may require that some services provided by the storage array meet particular criteria. Examples of such operational policies may include: a requirement for high availability; a requirement for failover; a requirement for a minimum data reduction ratio (including garbage collection performance, deduplication performance, or both); a requirement for a minimum input/output latency; a requirement for a minimum replication throughput; or a requirement for data retention. Another type of operational policy may be an 'expected' or 'healthy' operational policy. Such a policy may specify a maximum number of errors of particular types that are allowed, as well as other minimum operational metrics.

If the particular problem violates the operational policy of the storage array, the storage array services provider may, automatically and without user intervention, deploy one or more corrective measures to prevent the storage array from experiencing the particular problem. Examples of corrective measures may include a software upgrade, a firmware upgrade, setting of performance parameters, and the like. In this way, a storage array may be prevented from experiencing a problem that has occurred on other storage arrays and prevented from operating in a manner that violates the operational policy of the storage array. Corrective measures may also include measures other than setting performance parameters. For example, modifying behavior of an algorithm executing on the storage array to prevent a crash or prevent experiencing a known issue or bug.

The term 'prevent' as used here may refer to preempt and correct as context requires. That is, in some instances, corrective measures are deployed in order to preempt a problem from occurring in a storage array that has not yet exhibited the problem identified in the problem signature. In such an instance, that problem may have been previously identified in one or more storage arrays in a multiple array storage environment. The one or more storage arrays exhibiting the problem may have similar or common characteristics to the storage array that has not yet exhibited the problem. In this way, through the deployment of corrective measures, a storage array may be preempted from exhibiting the problem that one or more other storage arrays previously exhibited.

In other examples, a problem may have been experienced by a storage array, and through the identification of the problem through the use of the problem signature as described above, corrective measures may correct the problem being experienced. In either case, the effect of the problem is reduced greatly. That is, because the problem or potential for a problem is identified at an early stage, the effect of the problem is greatly reduced. In some embodiments, the problem is avoided entirely and, in others, the problem is corrected at a very early stage.

Deploying corrective actions may be carried out in various ways. In some embodiments, the storage array services provider may deploy one or more corrective measures automatically, without a user's approval or with a user's inferred approval (such as through the user 'opting-in' to automatic deployments of corrective measures). In other embodiments, the storage array services provider may be configured to deploy corrective measures only upon a user's explicit approval. Examples of such deployment upon a user's explicit approval may include staging an update of software of the storage array and updating the software only responsive to receiving an approval from the user. Another example of such deployment of corrective actions upon a user's explicit approval may include the storage array services provider (176) recommending to a user a modification of one or more tuning parameters for the storage array. In such embodiments, the storage array services provider may push such modification to the storage array after the user's approves the recommendation.

Additionally, multiple tiers of criticality may be implemented in which problems that are less critical need not be pushed without a user's approval while problems for which corrective measures are highly critical may be automatically pushed without a user's permission. In some instances, such automatic corrective measures may be provided without a user's permission at the time of the deployment of such corrective measures, but with a user's permission to all such deployments. That is, a user may 'opt-in' to automatic corrective measures in some embodiments.

In some embodiments, a particular problem may be identified but the problem may not violate an operational policy of the storage array. In such embodiments, the storage array services provider (176) may be configured to flag the particular problem. The storage array services provider may also be configured to take any number of actions in addition to flagging the particular problem such as informing the user of the flagged problem or recommending one or more corrective actions to be carried out.

The arrangement of computing devices, storage arrays, cloud-based service providers, networks and other devices making up the exemplary system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Proactively providing corrective measures for storage arrays in accordance with embodiments of the present invention is generally implemented with computers. In the system of FIG. 1, for example, all the computing devices (164-170), storage controllers (106, 112), and storage array services provider (176) may be implemented, to some extent at least, as computers. For further explanation, therefore, FIG. 2 sets forth a block diagram of several example computers useful for proactively providing corrective measures for storage arrays according to embodiments of the present invention. The example computers in FIG. 2 include a storage array services provider (176).

Figure 2:
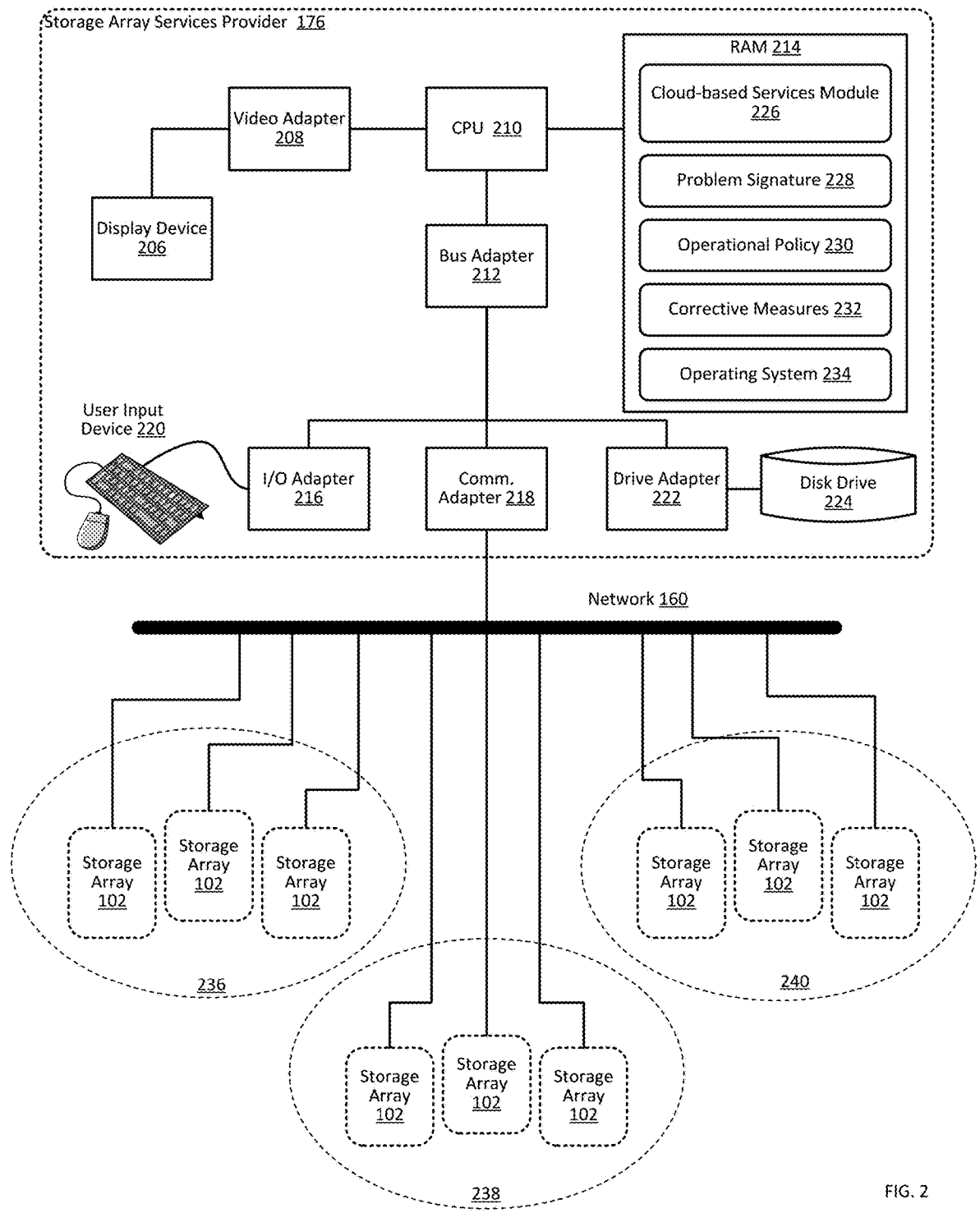
FIG. 2 sets forth a block diagram of several example computers useful for proactively providing corrective measures for storage arrays according to embodiments of the present invention.

The storage array services provider (176) of FIG. 2 includes at least one computer processor (210) or 'CPU' as well as random access memory (214) ('RAM') which is connected through a high speed memory bus and bus adapter (212) to processor (210) and to other components of the storage array services provider (176). Stored in RAM (214) is a cloud-based services module (226), a module of computer program instructions that when executed causes the storage array services provider (176) to proactively provide corrective measures to a storage array. The cloud-based services module (226) may receive data from a storage array, where the data includes one or more events; detect, in dependence upon a problem signature (228), one or more events from the data indicative of a particular problem, where the problem signature comprises a specification of a pattern of events indicative of the particular problem experienced by at least one other storage array; determine whether the particular problem violates an operational policy (230) of the storage array, where the operational policy specifies at least one requirement for an operational metric of the storage array; and if the particular problem violates the operational policy of the storage array, deploy automatically without user intervention one or more corrective measures (232) to prevent the storage array from experiencing the particular problem.

As mentioned above, the problem signature may be generated based on an analysis of data from one or more storage arrays that have experienced the particular problem. In the example of FIG. 2, three sets of storage arrays (102) are coupled to the storage array services provider for data communications. Each set may be located at a distinct physical location from the other sets. That is, each set may be located in a different data center at different location in the world. Further, each set may be owned by a different entity. All the storage arrays (102), however, provide data including events that occur within the storage array to the storage array services provider. To that end, the events provided by the storage arrays experiencing the same problem may be analyzed for commonalities so that a pattern of events indicative of the problem may be identified. Once identified, a problem signature for the problem may be generated and utilized as described above to prevent the same problem from occurring in other storage arrays.

Although proactively providing corrective measures for storage arrays in a multiple array storage environment is described here as being carried out generally by the storage array services provider (176), readers will understand that such steps may be carried out by other entities and modules. For example, the storage controller may execute a module of computer program instructions that proactively provides corrective measures for storage arrays, a management module (not shown in FIG. 2) in communication with the storage arrays within the local area network of the storage array environment may be configured to proactively provide corrective measures for storage arrays, and so on as will occur to readers of skill in the art.

Also stored in RAM (214) of the example storage array services provider (176) is an operating system (234). Examples of operating systems useful in computers configured for proactively providing corrective measures for storage arrays according to embodiments of the present invention include UNIX™, Linux™, Microsoft Windows™, and others as will occur to those of skill in the art. The operating system (234) and the cloud-based storage array services module (226) in the example of FIG. 2 are shown in RAM (168), but many components of such software typically are stored in non-volatile memory also, such as, for example, on a disk drive (224). Likewise, the modules depicted in RAM (238, 240) of the storage array (102) and client-side user computer (204) may be stored in non-volatile memory.

The storage array services provider (176) of FIG. 2 also includes disk drive adapter (222) coupled through an expansion bus and bus adapter (212) to the processor (210) and other components of the storage array services provider (176). Disk drive adapter (222) connects non-volatile data storage to the storage array services provider (176) in the form of disk drive (224). Disk drive adapters may be implemented in a variety of ways including as SATA (Serial Advanced Technology Attachment) adapters, PATA (Parallel ATA) adapters, Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example storage array services provider (176) of FIG. 2 includes one or more input/output ('I/O') adapters (216). I/O adapters implement user-oriented input/output through, for example, software drivers and computer hardware for controlling output to display devices such as computer display screens, as well as user input from user input devices (220) such as keyboards and mice. The example storage array services provider (176) of FIG. 2 also includes a video adapter (208), which is an example of an I/O adapter specially designed for graphic output to a display device (206) such as a display screen or computer monitor. Video adapter (208) is connected to the processor (210) through a high speed video bus.

The exemplary storage array services provider (176) of FIG. 2 includes a communications adapter (218) for data communications with the storage arrays (102) through the network (160). Such data communications may be carried out through data communications networks such as IP data communications networks, and in other ways as will occur to those of skill in the art. Communications adapters implement the hardware level of data communications through which one computer sends data communications to another computer, directly or through a data communications network. Examples of such communications adapters useful include modems for wired dial-up communications, Ethernet (IEEE 802.3) adapters for wired data communications, and 802.11 adapters for wireless data communications.

Readers of skill in the art will recognize that the components of the storage array services provider (176) as depicted in FIG. 2 are example computing components only. Such a storage array services provider (176) may be configured in various ways including, for example, as a server. Such a server may not include the I/O adapters, the driver adapters, display devices, video adapters and the like.

Figure 3:
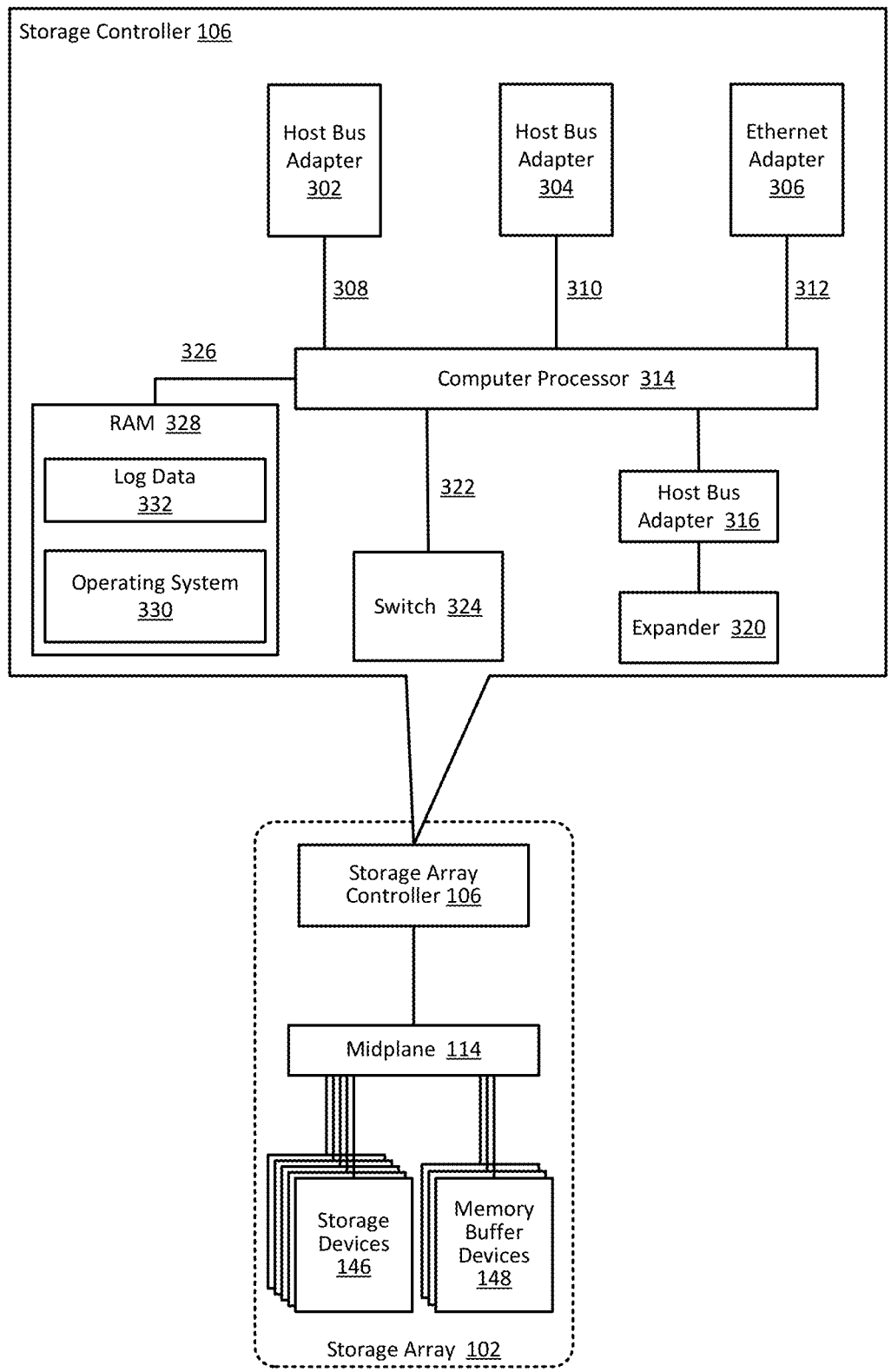
FIG. 3 sets forth a block diagram of an example storage controller of a storage array.

As mentioned above, a storage array (102) may also be implemented, at least to some extent, as a computer. For further explanation, therefore, FIG. 3 sets forth a block diagram of an example storage controller (106) of a storage array (102). The example storage controller includes a computer processor (314). The computer processor is coupled to RAM (214) through a DDR4 (Double-Data Rate 4) bus. Stored in RAM (214) is an operating system (330) and log data (332). Such log data may include events that occur within the storage array that are reported to the storage controller from firmware of the components of the storage array or events detected by the operating system (330) of the storage controller.

The processor (314) is also coupled for data communications through PCIe (Peripheral Component Interface express) links (308, 310, 312, 322) to several Fibre Channel host bus adapters (302, 304), an Ethernet adapter (306), and a PCIe switch (324). The Fibre Channel host bus adapters (308, 310) may couple the storage controller to a storage area network, such the SAN (158) depicted in the example of FIGS. 1 and 2. The Ethernet adapter (306) may couple the storage controller to a local area network such as the LAN (160) depicted in the example of FIGS. 1 and 2. The PCIe switch (324) may provide data communications across other PCI links through the midplane to PCI endpoints, such as storage devices or write buffer devices. Likewise, the processor (314) is also coupled through a SAS (Serial Attached SCSI) host bus adapter (316) to a SAS expander (320). The SAS expander may provide SAS connections between the computer processor (314) and other devices through the midplane.

Readers of skill in the art will recognize that these components, protocols, adapters, and architectures are for illustration only, not limitation. Such a storage controller may be implemented in a variety of different ways. Each such way is well within the scope of the present invention.

Figure 4:
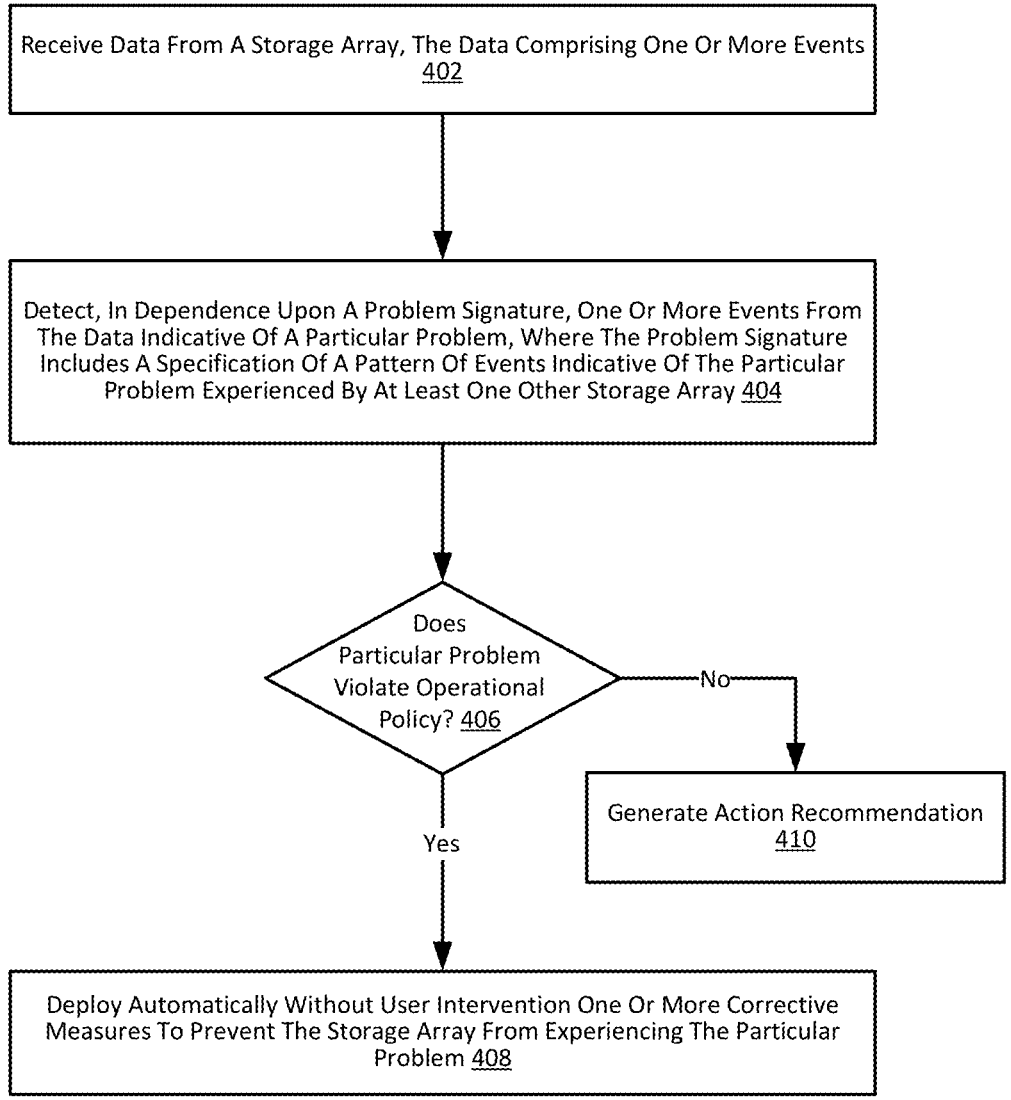
FIG. 4 sets forth a flow chart illustrating an exemplary method for proactively providing corrective measures for storage arrays according to embodiments of the present invention.

For further explanation, FIG. 4 sets forth a flow chart illustrating an exemplary method for proactively providing corrective measures for storage arrays according to embodiments of the present invention. The method of FIG. 4 may be carried out by a cloud-based storage array services provider (176 in the example of FIG. 1).

The method of FIG. 4 includes receiving (402) data from a storage array. The data received from the storage array comprising one or more events. The events, as mentioned above, may include any occurrence of a component within the storage array, any occurrence of software, performance metrics, and so on as will occur to readers of skill in the art. Receiving (402) such data may be carried out in a variety of ways. In some embodiments, for example, the storage array services provider may receive such data periodically through a data communications network and one or more Application Programming Interfaces ('APIs') exposed to software executing on a storage controller of the storage array.

The method of FIG. 4 also includes detecting (404), in dependence upon a problem signature, one or more events from the data indicative of a particular problem. As mentioned above, the problem signature may be implemented as a specification of a pattern of events indicative of the particular problem experienced by at least one other storage array. Detecting one or more events indicative of the particular from the data received from the storage may be carried out in a variety of ways. For example, the storage array services provider may periodically compare events received from a storage array to the patterns of events of a plurality of problem signatures. In some embodiments, one or more events of one or more problem signatures may be flagged. The storage array services provider may be configured to begin a comparison of events received from a storage array to one or more problem signatures that include a flagged event upon receipt of that flagged event.

The method of FIG. 4 also includes determining (406) whether the particular problem violates an operational policy of the storage array. As mentioned above, the operational policy specifies at least one requirement for an operational metric of the storage array. Determining whether the particular problem violates the operational policy of the storage array may be carried out by determining whether the effect of the problem, if experienced by the storage array, may cause one or more operational metrics to fail to meet at least one requirement of the operational policy.

If the particular problem violates the operational policy of the storage array, the method of FIG. 4 continues by deploying (408), automatically without user intervention, one or more corrective measures to prevent the storage array from experiencing the particular problem. Deploying (408) one or more corrective measures to prevent the storage array from experiencing the particular problem may be carried out by pushing from the storage array services provider to the storage array via a data communications network and one or more APIs, an update to software, a change to one or more performance tuning metrics, an update to firmware, a change in configuration, and so on as will occur to readers of skill in the art. In some embodiments, the storage array services provider may instruct the storage array to update software or firmware, in a background process.

If the particular problem does not violate the operational policy of the storage array, the method of FIG. 4 continues by generating (410) an action recommendation to provide to a user. Generating (410) an action recommendation may include generating a notification of a type of corrective action recommended to prevent the occurrence of the particular problem. Additionally, the action recommendation may include a severity or criticality level of the recommended corrective action. In some embodiments, such an action recommendation may include a proposed schedule for applying the recommended corrective action.

In some embodiments, such an action recommendation may include notifying a user of the storage array of physical corrective measures to be carried out by the user. That is, a corrective measure that cannot be carried within the storage array, through a software update or configuration change for example, may be identified as a means to prevent a particular problem. In such an embodiment, a user of the storage array may be notified to take such measures. A physical change, for example, such as utilizing a greater number or fewer number ports, may alleviate a problem identified in a problem signature. Such a corrective measure, however, cannot be applied by a storage array services provider.

Exemplary embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of preventing storage errors using problem signatures, the method comprising:
   identifying a possible future occurrence of a problem with a storage array by detecting on the storage array, a pattern of events identified as being common to a plurality of other storage arrays that all experience the same problem;
   in response to detecting the pattern of events identified as being common to the plurality of other storage arrays that all experience the same problem, identifying one or more corrective measures to prevent the problem from occurring on the storage array;
   based on an assessed impact of the one or more corrective measures on the storage array, determining whether to deploy the one or more corrective measures; and
   in response to determining to deploy the identified one or more corrective measures, deploying the one or more corrective measures on the storage array.

2. The method of claim 1 further comprising determining that the problem violates an operational policy of the storage array, the operational policy specifying at least one requirement for an operational metric of the storage array, wherein the operational policy of the storage array further comprises a specification of a requirement for high availability.

3. The method of claim 1 further comprising determining that the problem violates an operational policy of the storage array, the operational policy specifying at least one requirement for an operational metric of the storage array, wherein the operational policy of the storage array further comprises a specification of a requirement for failover availability.

4. The method of claim 1 further comprising determining that the problem violates an operational policy of the storage array, the operational policy specifying at least one requirement for an operational metric of the storage array, wherein the operational policy of the storage array further comprises a specification of a requirement for a minimum data reduction ratio.

5. The method of claim 1 further comprising determining that the problem violates an operational policy of the storage array, the operational policy specifying at least one requirement for an operational metric of the storage array, wherein the operational policy of the storage array further comprises a specification of a requirement for a minimum input/output latency.

6. The method of claim 1 further comprising determining that the problem violates an operational policy of the storage array, the operational policy specifying at least one requirement for an operational metric of the storage array, wherein the operational policy of the storage array further comprises a specification of a requirement for a minimum replication throughput.

7. The method of claim 1 further comprising determining that the problem violates an operational policy of the storage array, the operational policy specifying at least one requirement for an operational metric of the storage array, wherein the operational policy of the storage array further comprises a specification of a requirement for data retention.

8. An apparatus for preventing storage errors using problem signatures, the apparatus comprising a computer processor and a computer memory operatively coupled to the computer processor, the computer memory having disposed within it computer program instructions that, when executed by the computer processor, cause the apparatus to carry out the steps of:
   identifying a possible future occurrence of a problem with a storage array by detecting on the storage array, a pattern of events identified as being common to a plurality of other storage arrays that all experience the same problem;
   in response to detecting the pattern of events identified as being common to the plurality of other storage arrays that all experience the same problem, identifying one or more corrective measures to prevent the problem from occurring on the storage array;
   based on an assessed impact of the one or more corrective measures on the storage array, determining whether to deploy the one or more corrective measures; and
   in response to determining to deploy the identified one or more corrective measures, deploying the one or more corrective measures on the storage array.

9. The apparatus of claim 8 wherein the computer memory includes computer program instructions that, when executed by the computer processor, cause the apparatus to carry out the step of determining that the problem violates an operational policy of the storage array, the operational policy specifying at least one requirement for an operational metric of the storage array, wherein the operational policy of the storage array further comprises a specification of a requirement for high availability.

10. The apparatus of claim 8 wherein the computer memory includes computer program instructions that, when executed by the computer processor, cause the apparatus to carry out the step of determining that the problem violates an operational policy of the storage array, the operational policy specifying at least one requirement for an operational metric of the storage array, wherein the operational policy of the storage array further comprises a specification of a requirement for failover availability.

11. The apparatus of claim 8 wherein the computer memory includes computer program instructions that, when executed by the computer processor, cause the apparatus to carry out the step of determining that the problem violates an operational policy of the storage array, the operational policy specifying at least one requirement for an operational metric of the storage array, wherein the operational policy of the storage array further comprises a specification of a requirement for a minimum data reduction ratio.

12. The apparatus of claim 8 wherein the computer memory includes computer program instructions that, when executed by the computer processor, cause the apparatus to carry out the step of determining that the problem violates an operational policy of the storage array, the operational policy specifying at least one requirement for an operational metric of the storage array, wherein the operational policy of the storage array further comprises a specification of a requirement for a minimum input/output latency.

13. The apparatus of claim 8 wherein the computer memory includes computer program instructions that, when executed by the computer processor, cause the apparatus to carry out the step of determining that the problem violates an operational policy of the storage array, the operational policy specifying at least one requirement for an operational metric of the storage array, wherein the operational policy of the storage array further comprises a specification of a requirement for a minimum replication throughput.

14. The apparatus of claim 8 wherein the computer memory includes computer program instructions that, when executed by the computer processor, cause the apparatus to carry out the step of determining that the problem violates an operational policy of the storage array, the operational policy specifying at least one requirement for an operational metric of the storage array, wherein the operational policy of the storage array further comprises a specification of a requirement for data retention.

15. A computer program product for preventing storage errors using problem signatures, the computer program product disposed upon a non-transitory computer readable medium, the computer program product comprising computer program instructions that, when executed, cause a computer to carry out the steps of:
- identifying a possible future occurrence of a problem with a storage array by detecting on the storage array, a pattern of events identified as being common to a plurality of other storage arrays that all experience the same problem;
- in response to detecting the pattern of events identified as being common to the plurality of other storage arrays that all experience the same problem, identifying one or more corrective measures to prevent the problem from occurring on the storage array;
- based on an assessed impact of the one or more corrective measures on the storage array, determining whether to deploy the one or more corrective measures; and
- in response to determining to deploy the identified one or more corrective measures, deploying the one or more corrective measures on the storage array.

16. The computer program product of claim 15 further comprising computer program instructions that, when executed, cause the computer to carry out the step of determining that the problem violates an operational policy of the storage array, the operational policy specifying at least one requirement for an operational metric of the storage array, wherein the operational policy of the storage array further comprises a specification of a requirement for high availability.

17. The computer program product of claim 15 further comprising computer program instructions that, when executed, cause the computer to carry out the step of determining that the problem violates an operational policy of the storage array, the operational policy specifying at least one requirement for an operational metric of the storage array, wherein the operational policy of the storage array further comprises a specification of a requirement for failover availability.

18. The computer program product of claim 15 further comprising computer program instructions that, when executed, cause the computer to carry out the step of determining that the problem violates an operational policy of the storage array, the operational policy specifying at least one requirement for an operational metric of the storage array, wherein the operational policy of the storage array further comprises a specification of a requirement for a minimum data reduction ratio.

19. The computer program product of claim 15 further comprising computer program instructions that, when executed, cause the computer to carry out the step of determining that the problem violates an operational policy of the storage array, the operational policy specifying at least one requirement for an operational metric of the storage array, wherein the operational policy of the storage array further comprises a specification of a requirement for a minimum input/output latency.

20. The computer program product of claim 15 further comprising computer program instructions that, when executed, cause the computer to carry out the step of determining that the problem violates an operational policy of the storage array, the operational policy specifying at least one requirement for an operational metric of the storage array, wherein the operational policy of the storage array further comprises a specification of a requirement for a minimum replication throughput.

* * * * *